US008359381B2

(12) United States Patent
Choi

(10) Patent No.: US 8,359,381 B2
(45) Date of Patent: *Jan. 22, 2013

(54) METHOD FOR TRIGGERED LOCATION SERVICE IN SUPL

(75) Inventor: Jae-Hyuk Choi, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 375 days.

This patent is subject to a terminal disclaimer.

(21) Appl. No.: 12/682,887

(22) PCT Filed: Aug. 21, 2008

(86) PCT No.: PCT/KR2008/004871
§ 371 (c)(1),
(2), (4) Date: Apr. 13, 2010

(87) PCT Pub. No.: WO2009/051339
PCT Pub. Date: Apr. 23, 2009

(65) Prior Publication Data
US 2010/0228847 A1 Sep. 9, 2010

Related U.S. Application Data

(60) Provisional application No. 60/980,042, filed on Oct. 15, 2007.

(30) Foreign Application Priority Data

Nov. 28, 2007 (KR) .................. 10-2007-0122308

(51) Int. Cl.
*G06F 15/173* (2006.01)
(52) U.S. Cl. ........ 709/223; 709/203; 709/225; 709/230; 455/456.1; 455/456.3; 379/76

(58) Field of Classification Search .................. 709/223, 709/203, 225, 230; 455/456.1, 456.3; 379/76
See application file for complete search history.

(56) References Cited

U.S. PATENT DOCUMENTS

| 6,654,447 | B1 * | 11/2003 | Dewan | 379/76 |
| 7,853,272 | B2 * | 12/2010 | Tipnis et al. | 455/456.3 |
| 2003/0020623 | A1 * | 1/2003 | Cao et al. | 340/686.6 |
| 2006/0223490 | A1 * | 10/2006 | Kim et al. | 455/403 |
| 2007/0082681 | A1 * | 4/2007 | Kim et al. | 455/456.1 |
| 2007/0082682 | A1 * | 4/2007 | Kim et al. | 455/456.1 |
| 2008/0109650 | A1 * | 5/2008 | Shim et al. | 713/151 |
| 2008/0162633 | A1 * | 7/2008 | Scherpa et al. | 709/204 |
| 2008/0189365 | A1 * | 8/2008 | Narayanaswami et al. | 709/204 |

FOREIGN PATENT DOCUMENTS

KR 2007031617 A * 3/2007

OTHER PUBLICATIONS

Open Mobile Alliance, "Secure User Plane Location Architecture", v1.0, Jun. 15, 2007).*
Open Mobile Alliance, Secure User Plane Location Architecture, Approved Version 1.0, OMA-AD-V1_0-20070615-A, pp. 1-73, Jun. 15, 2007.

* cited by examiner

*Primary Examiner* — Yves Dalencourt
*Assistant Examiner* — Michael C Lai
(74) *Attorney, Agent, or Firm* — Birch, Stewart, Kolasch & Birch, LLP

(57) ABSTRACT

Disclosed is an SUPL-based triggered location service which provides a triggered location service capable of pausing an ongoing session and then resuming the paused session by using a dedicated or common message and other certain parameters indicating a session pause/resume.

19 Claims, 6 Drawing Sheets

US 8,359,381 B2

METHOD FOR TRIGGERED LOCATION SERVICE IN SUPL

This application is the National Phase of PCT/KR2008/004871 filed on Aug. 21, 2008, which claims priority under 35 U.S.C. 119(e) to U.S. Provisional Application No. 60/980,042 filed on Oct. 15, 2007 and under 35 U.S.C. 119(a) to Patent Application No. 10-2007-0122308 filed in Republic of Korea on Nov. 28, 2007, all of which are hereby expressly incorporated by reference into the present application.

TECHNICAL FIELD

The present invention relates to a location information system based on Secure User Plane Location (SUPL) architecture, and more particularly, to pause and resume a triggered session in a triggered location service based on a specific SUPL architecture.

BACKGROUND ART

A mobile communication system provides a location service for supplying a location of a terminal to a certain entity periodically or in response to a request, by including a relevant functional part for calculating the location of the terminal in a mobile communication network.

The location service-related network structure varies according to the internal network structure such as 3GPP or 3GPP2. Methods for calculating a current location of a terminal include a cell-ID method for transferring an ID of a cell to which the terminal belongs, a method for measuring the time taken for radio waves of the terminal to reach each base station and calculating the location of the terminal by using trigonometric measurement, and a method using the Global Positioning System (GPS).

In order to provide the location service to a user, considerable signaling and location information should be transferred between the terminal and a location server. The so-called 'positioning technologies' that have been standardized for providing such location services, for instance, a location service based upon the location (position) of a mobile terminal, are undergoing rapid widespread dissemination. The positioning technologies can be provided through a user plane and a control plane. A Secure User Plane Location (SUPL) protocol, which is well-known as an example of the positioning technologies, provides the location service through the user plane.

The SUPL protocol is an efficient method for transferring the location information required for the location calculation of a mobile station. The SUPL protocol employs a user plane data bearer so as to transfer positioning assistance information such as GPS assistance, and to carry positioning technology associated protocols between the mobile terminal and a network.

In general, an SUPL network for providing the location service in a location information system includes an SUPL agent, SUPL Location Platform (SLP), and SUPL Enabled Terminal (SET). The SUPL agent refers to a logical service access point using location information which is actually measured. The SLP refers to a SUPL service access point at a network portion where network resources are accessed to obtain the location information. The SET, being a device capable of communicating with the SUPL network using a SUPL interface, supports procedures defined in the SUPL by interworking with the network through the user plane bearer. Here, the SET may be one of a User Equipment (UE) for UMTS, a Mobile Station (MS) for GSM, a laptop computer having a SET function, a Personal Digital Assistant (PDA) or the like. The SET can be various mobile terminals which are connected through a Wideband LAN (WLAN).

In the location information system, a network for which a user has initially registered is called a home network, and when the user moves or roams to another area, other than the home network area, the network of that other area is called a visited network. An SLP in the home network is called an H-SLP (Home-SLP) while an SLP in the visited network is called a V-SLP (Visited-SLP).

When an SUPL procedure starts in the network of such location information system, an SLP to which an external client is first connected is called a Requesting SLP (R-SLP). The R-SLP is a logical entity, which can be the same as the H-SLP or not. An SET aimed to track its current location is defined by a target SET.

The SLP, as a network element, may include an SUPL Positioning Center (SPC) which is an entity for calculating an actual location, and an SUPL Location Center (SLC) for managing other functions of the SLP excluding the function for calculating location information. Here, the SLC handles roaming, resource managing, and the like.

Therefore, the SET can calculate the location information by communicating with the SPC via the SLC (Proxy mode), or calculate the location information by opening a direct connection with the SPC (Non-proxy mode).

A Triggered Location Service in the SUPL provides location information of a target SET when a specific condition (event) occurs. The triggered location service may include a periodic triggered service which periodically provides location information of a target SET, and an area event triggered service which provides location information of a target SET whenever a specific area occurs.

In the current triggered location service, a triggered session would be ongoing once it has been initiated unless an area event has occurred, a service time has expired, or the triggered session is forcibly terminated. Once the triggered session has been initiated, the session would last for a long period of time. In this instance, a target SET may have a difficulty in maintaining the ongoing triggered session due to a certain condition, or desires to temporarily terminate (end) the ongoing triggered session for its privacy. In such cases, from a perspective of a party which has requested the triggered location service, the ongoing triggered session is unilaterally terminated. The service requesting party should request the triggered location service again from the network (the network performing the triggered location service). This may cause an inconvenience to the requesting party (i.e., user) from the perspective of a service user, and a waste of network resources from the perspective of the network.

DISCLOSURE OF THE INVENTION

Therefore, it is an object of the present invention to pause and resume a triggered session without terminating the session when a terminal desires to pause the triggered session while the session is still ongoing in a triggered location service.

To achieve this object, there is provided a method for a triggered location service according to the present invention, in a method for performing a triggered session between a server and a terminal for a SUPL-based triggered location service, including: receiving, from a target terminal, a triggered session pause message during the triggered session for a SUPL triggered location service; receiving, from the target terminal, a triggered session resume message while the triggered session has been paused; and performing the triggered session between the server and the target terminal.

Preferably, the method further includes sending, to the target terminal, a triggered session pause response message in response to the triggered session pause message; and sending, to the target terminal, a triggered session resume response message in response to the triggered session resume message.

Preferably, the method further includes receiving, from a source terminal/apparatus, a SUPL triggered location service request message including a pause-mode parameter; and transferring, to the target terminal, the pause-mode parameter so as to set the triggered session.

Preferably, the method further includes notifying, to the source terminal/apparatus, that the triggered session has been paused after receiving the triggered session pause message; and notifying, to the source terminal/apparatus, that the triggered session has been resumed after receiving the triggered session resume message.

To achieve this object, there is provided a method for a triggered location service according to the present invention, in a method for performing a triggered session between a server and a target terminal for a SUPL-based triggered location service, including: transmitting, by the target terminal, a message notifying a pause of the triggered session to the server; and transmitting, by the target terminal, a message notifying a resumption of the paused triggered session to the server.

Preferably, the method further includes notifying, by the server, that the triggered session has been paused to a source terminal/apparatus when the triggered session has been paused; and notifying, by the server, that the triggered session has been resumed to the source terminal/apparatus when the triggered session has been resumed.

EFFECT

According to the present invention, while a session of a SUPL triggered location service is still ongoing, the session may be paused without being terminated as well as be resumed.

Since the present invention provides a function allowing the target terminal to pause/resume an ongoing SUPL triggered session, there is no need for a service requester to request the SUPL triggered session paused by the target terminal. From the network perspective, there is no need to re-establish a SUPL triggered session by a request from a service requester, thereby preventing resource consumption of the network and unnecessary triggered session request attempt.

MODES FOR CARRYING OUT THE PREFERRED EMBODIMENTS

Descriptions of construction and operation of preferred embodiments of the present invention will be given with reference to the accompanying drawings.

The present invention has recognized that there is no method for pausing a triggered session during the triggered session for a triggered location service in a SUPL-based location information system, and then for resuming the paused session. In recognition of such condition, the present invention is directed to provide a triggered location service capable of pausing an ongoing session and then resuming the paused session by using a dedicated or common message and other certain parameters indicating a session pause/resume.

Exemplary embodiments of the present invention are classified based on a type of messages and parameters, and depending on whether a subject of a session pause/resume is a target terminal or a server (SLP). In particular, the server is the subject of the session pause/resume in second and sixth embodiments of the present invention, and the target terminal is the subject of the session pause/resume in first, third and fifth embodiments of the present invention.

The preferred embodiments of the present invention are based on a SUPL non-roaming service, not a SUPL roaming service. However, this is for clarity in explanation of the present invention, and technical scopes of the present invention would be equally applied to the SUPL roaming service.

Figure 1:
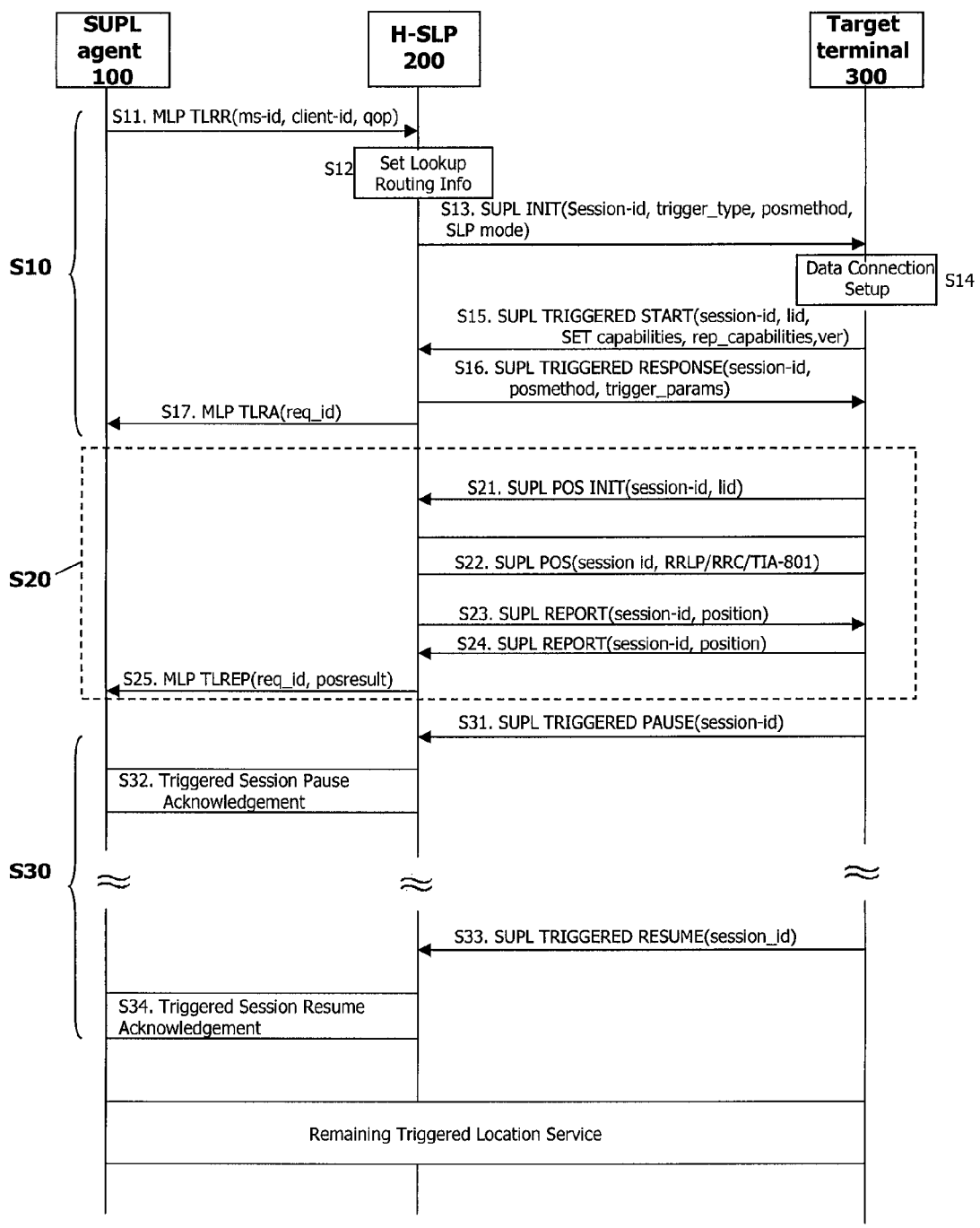
FIG. 1 is a signal flowchart illustrating a procedure of pausing and resuming a session in a triggered location service according to a first embodiment of the present invention.

FIG. 1 is a signal flowchart illustrating a procedure of pausing and resuming a session in a triggered location service according to a first embodiment of the present invention. In FIG. 1, an SUPL agent 100 is an entity mounted in a terminal (i.e., a source terminal/apparatus) and performing SUPL-related functions. An H-SLP 200 is a home network SUPL server to which the SUPL agent is connected.

Referring to FIG. 1, step S10 is a process in which the SUPL agent 100 (or source terminal/apparatus) requests a triggered location service, and an SUPL triggered session between the H-SLP 200 and the target terminal 300 for a triggered location service is initiated. In addition, step S20 in FIG. 1 is a process which tracks a position (location) of the target terminal and provides the tracked location information to the SUPL agent 100. Step S30 in FIG. 1 is a process which pauses and resumes the ongoing session. Detailed descriptions of functions and operations of parameters included in messages described in steps (S10 and S20) in FIG. 1 and the triggered location service are based on contents described in OMA-SUPL-TS-ULP-V2.0-20070927-D.

Hereinafter, description of a first embodiment of the present invention will be given with reference to the signal flowchart in FIG. 1.

In order to request an SUPL-based triggered location service, the SUPL agent 100 transmits an MLP TLRR message to the H-SLP 200 (S11). The MLP TLRR message includes parameters, such as ms-id, client-id and qop. The ms-id refers to a parameter (or an element) containing identification (ID) information of target terminal 300.

Based on the client-id received in step S11, the H-SLP 200 authenticates the SUPL agent 100 as well as authenticates whether or not the SUPL agent 100 requests the service. In addition, based on the ms-id received in step S11, the H-SLP 200 verifies subscriber information of the target terminal 300.

The H-SLP 200 searches current routing information of the target terminal 300 and checks that the target terminal 300 is not roaming (S12). Here, step S12 is applied only to the non-roaming service.

The H-SLP 200 initiates a triggered location service session by sending an SUPL INIT message to the target terminal 300 (S13). The SUPL INIT message may be a WAP PUSH or an SMS trigger. The SUPL INIT message includes parameters, such as session-id, trigger_type=area event, posmethod and SLP mode. Having received the SUPL INIT message, the target terminal 300 is connected to a packet network (S14).

The target terminal 300 sends a message for starting a session for a triggered location service, i.e., SUPL TRIGGERED START message (S15). The SUPL TRIGGERED START message includes parameters, such as a session-id, SET-capabilities indicating the capabilities of the target terminal 300, a location identifier (lid) indicating a specific cell in a mobile communication network. The SET capabilities include information about positioning methods that can be supported by the target terminal 300 (e.g., SET-Assisted A-GPS or SET Based A-GPS) and associated positioning protocols (e.g., RRLP, RRC, and TIA-801).

Upon receiving the SUPL TRIGGERED START message, the H-SLP 200 selects, based on information included in the message, a positioning method to be used for the SUPL triggered session, and then sends an SUPL TRIGGERED RESPONSE message to the target terminal 300 (S16). The SUPL TRIGGERED RESPONSE message includes parameters, such as session-id, posmethod as well as trigger parameters (trigger_params' in FIG. 1).

If the SUPL triggered session is completed through above steps (S13~S16), the H-SLP 200 transmits an MLP TLRA message to the SUPL agent 100 to notify that the request for the SUPL triggered location service in S11 has been accepted (S17). The MLP TLRA message includes a req id parameter. Here, the req id parameter is used as a transaction id for an entire period of the triggered location service session.

Based on the parameters containing information obtained through the above steps (S13~S16), the target terminal 300 performs a triggered location service which tracks/calculates its position and then reports the calculated positioning information to the H-SLP 200 (S20). Meanwhile, the triggered location service in the series of step (S20) described in all embodiments of the present invention is merely exemplary, and may be modified in various forms. Accordingly, in the exemplary embodiments of the present invention, signal flows corresponding to step (S20) may be applied by being variously modified or changed in signal flows of other location services, and equally applied to the Triggered Location Service Feature (Triggered Service: Event Trigger) described in OMA-TS-ULP-V2.0-20070927-D.

Hereinafter, step S20 will be described in more detail.

Periodically (in case of a periodic service) or upon occurrence of a certain event (in case of an event triggered service), the target terminal 300 performs an SUPL POS session by transmitting the SUPL POS INIT message to the H-SLP 200 (S21). Here, a position of the target terminal 300 is tracked and estimated (calculated) while the target terminal 300 exchanges position procedure messages with the H-SLP until a previously set Quality of Positioning (QoP) is satisfied (S22). It should be noted that in the exemplary embodiment in FIG. 1, the position of the target terminal 300 is calculated by the H-SLP 200. Accordingly, if the positioning estimate of the target terminal 300 is completed, the H-SLP 200 sends a SUPL REPORT message to the target terminal 300 (S23). The SUPL REPORT message includes a session-id and information related to the positioning estimate. In order to check whether or not the trigger condition is satisfied, the target terminal 300 compares the received location information with the trigger parameter.

The SUPL REPORT message containing the positioning estimate of the target terminal 300 or the like is transferred to the H-SLP 200 from the target terminal 300 (S24). The SUPL REPORT message in step S24 includes a session-id and a position parameter. The position parameter includes information associated with the positioning estimate. The H-SLP 200 sends the positioning estimate to the SUPL agent through the MLP TLREP message (S25).

While the session between the H-SLP 200 and the target terminal 300 is still ongoing, there would be a case when the target terminal 300 desires to pause the session. Then, the target terminal 300 sends a SUPL TRIGGERED PAUSE message to the H-SLP 200 so as to notify that the ongoing session is to be paused (S31). The SUPL TRIGGERED PAUSE message includes a session-id parameter. The session-id parameter includes a value capable of identifying the target terminal 300 (i.e., target terminal ID) and a value capable of identifying the H-SLP 200 (i.e., H-SLP ID). When multi sessions between the H-SLP 200 and the target terminal 300 are simultaneously performed, the session-id parameter may function as information capable of distinguishing (discriminating) each session among the multiple sessions. The H-SLP 200 uses an MLP message to notify that the triggered session has been currently paused by the target terminal 300 to the SUPL agent 100 (S32).

Under the state that the triggered session has been currently paused in step (S31), if the target terminal can resume the paused session, the target terminal 300 sends an SUPL TRIGGERED RESUME message. Here, the SUPL TRIGGERED RESUME message serves as a notification message informing that the target terminal 300 can resume the paused triggered session (S33). In addition, the SUPL TRIGGERED RESUME message includes a session-id parameter, thereby allowing the H-SLP 200 to recognize a session to be resumed between the target terminal 300 and the H-SLP 200. The H-SLP 200 uses the MLP message to notify to the SUPL agent 100 that the triggered session paused by the target terminal 300 is currently resumed (S34). Thusly, the paused triggered session is resumed through step (S33).

Figure 2:
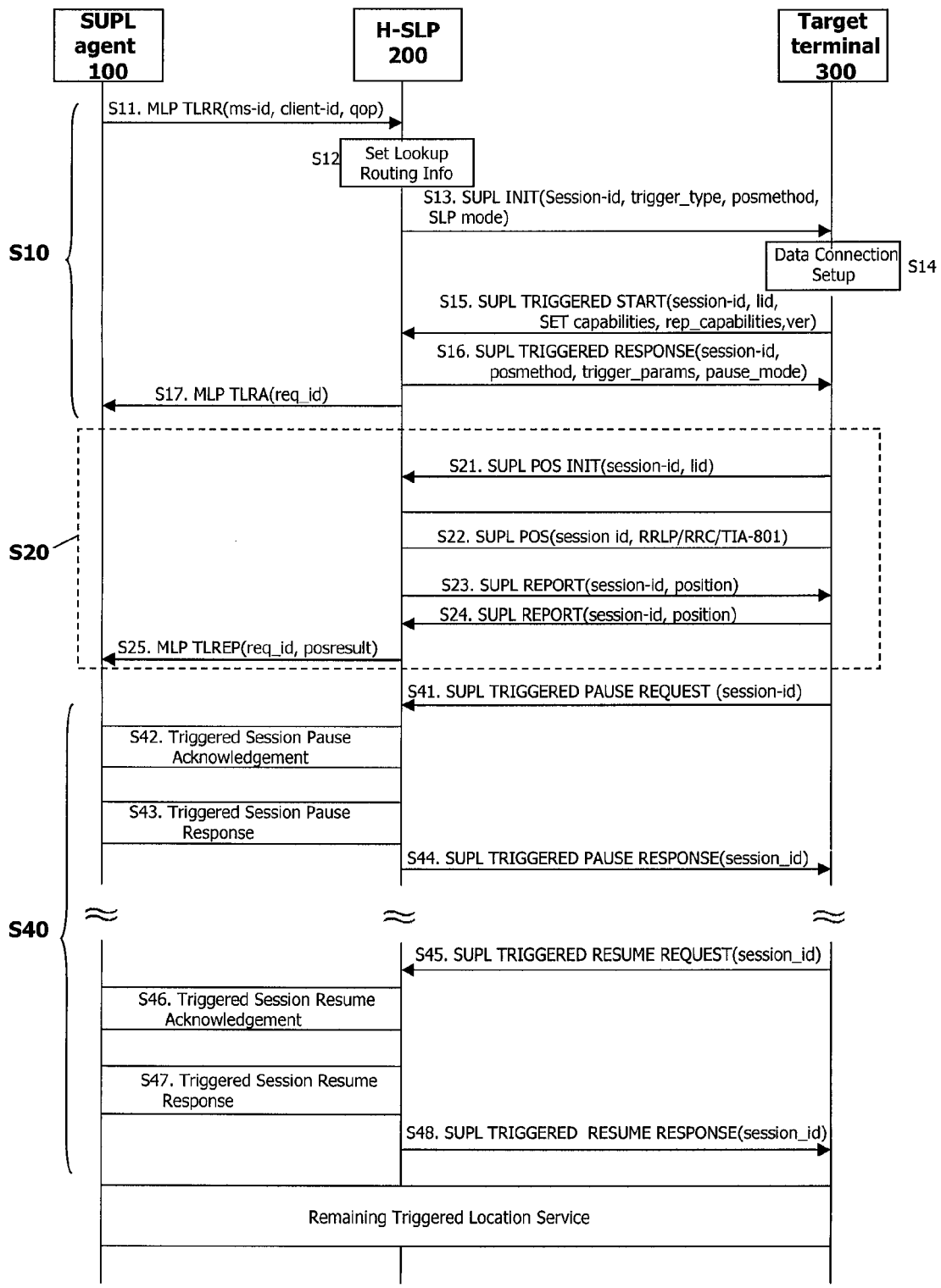
FIG. 2 is a signal flowchart illustrating a procedure of pausing and resuming a session in a triggered location service according to a second embodiment of the present invention.

FIG. 2 is a signal flowchart illustrating a procedure of pausing and resuming a session in a triggered location service according to a second embodiment of the present invention. When compared to the first embodiment in FIG. 1, the second embodiment in FIG. 2 has a different subject performing the pause/resumption of the triggered session from that in FIG. 1. That is, the target terminal 300 performs the pause and resumption of the triggered session in the first embodiment in FIG. 1, while the H-SLP 200 performs the pause/resumption of the triggered session in the second embodiment in FIG. 2.

Steps S10 and S20 in FIG. 2 have the same operations and functions as corresponding steps in FIG. 1. Therefore, explanations for steps S10 and S20 in FIG. 2 are omitted.

Hereinafter, a series of operations corresponding to step S40 in FIG. 2 will be described.

The target terminal 300 sends, to the H-SLP 200, a message for requesting a pause of an ongoing triggered session, i.e., SUPL TRIGGERED PAUSE REQUEST message (S41). The SUPL TRIGGERED PAUSE REQUEST message includes a session-id parameter indicating a session to be paused.

The H-SLP 200 uses the MLP message to notify to the SUPL agent 100 that the request for the pause of the triggered session has been made by the target terminal 300 (S42). Then, the SUPL agent 100 uses the MLP message to give a positive acknowledgement or negative acknowledgement for the session pause in step S42 (S43). If the SUPL agent 100 has transmitted the positive acknowledgement for the session pause to the H-SLP 200, the H-SLP 200 sends an SUPL TRIGGERED PAUSE RESPONSE message to the target terminal 300. The SUPL TRIGGERED PAUSE RESPONSE message is a message notifying that the request of the session pause by the target terminal 300 has been accepted and thusly the session is paused (S44). In addition, the SUPL TRIGGERED PAUSE RESPONSE message includes a session-id parameter indicating the paused session. Conversely, in step S43, if the SUPL agent 100 has transmitted the negative acknowledgement for the session pause to the H-SLP 200, the SUPL TRIGGERED PAUSE RESPONSE message would mean that the ongoing triggered session is to be released. Here, the SUPL TRIGGERED PAUSE RESPONSE message may include a reason-code indicating a session release.

Currently, the session between the target terminal 300 and the H-SLP 200 is paused through the SUPL TRIGGERED PAUSE REQUEST message and the SUPL TRIGGERED PAUSE RESPONSE message. Under such condition, if the target terminal 300 is to resume the session, the target terminal 300 sends an SUPL TRIGGERED RESUME REQUEST message to the H-SLP 200 so as to request the resumption of the paused session (S45). Here, the SUPL TRIGGERED RESUME REQUEST message includes a session-id parameter indicating a session to be resumed after being paused. The H-SLP 200 uses the MLP message to notify, to the SUPL agent 100, that the request for the triggered session resumption has been made by the target terminal 300 (S46). Then, the SUPL agent 100 responds to step (S46) by using the MLP message (S47). The H-SLP 200 sends an SUPL TRIGGERED RESUME RESPONSE message to the target terminal 300 so as to notify that the paused session is resumed (S48). Here, the SUPL TRIGGERED RESUME RESPONSE message includes a session-id indicating a session to be resumed.

Therefore, in the second embodiment in FIG. 2, if the target terminal 300 requests the pause or resumption of the session, the H-SLP 200 pauses or resumes the session in response to such request.

Figure 3:
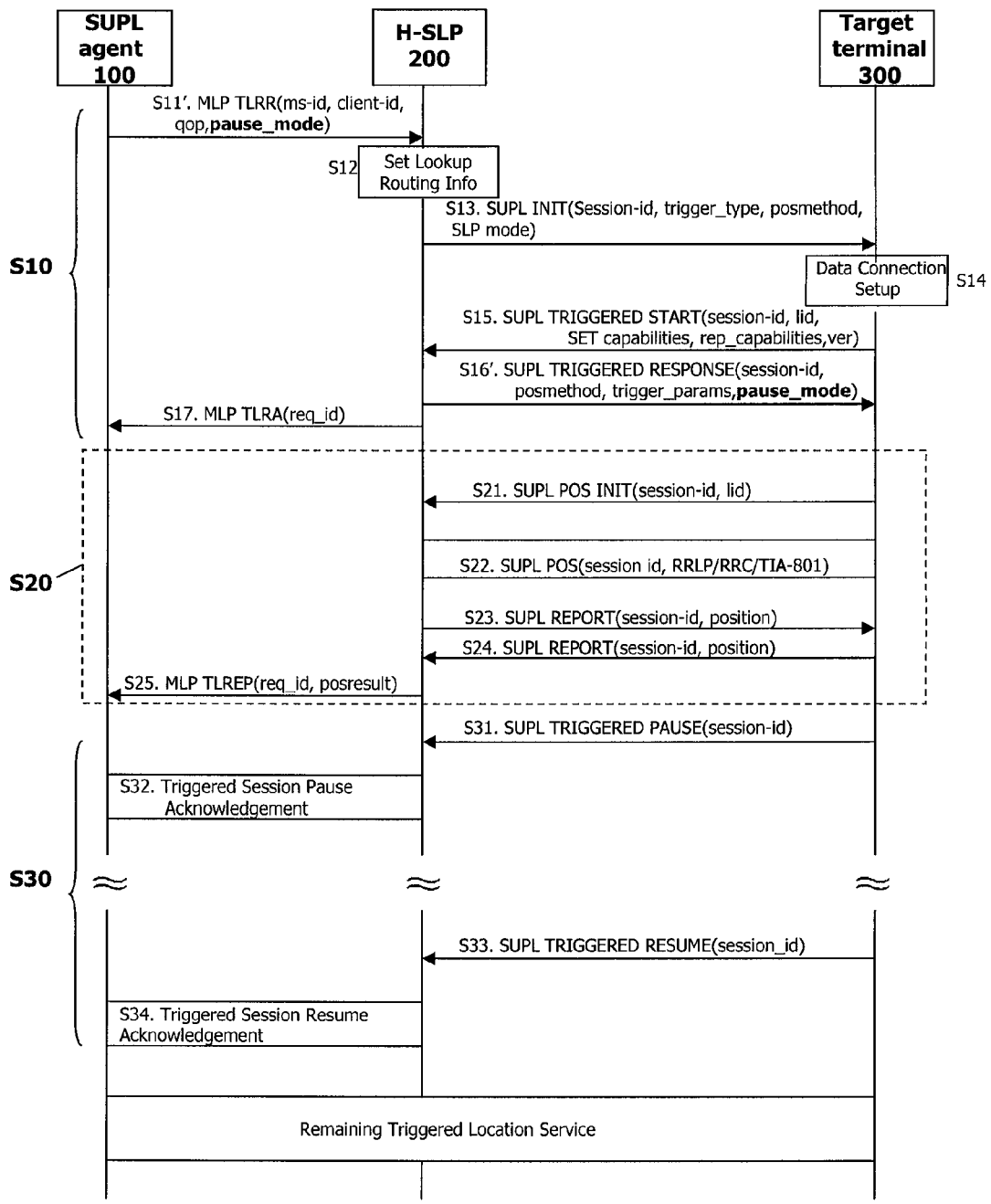
FIG. 3 is a signal flowchart illustrating a procedure of pausing and resuming a session in a triggered location service according to a third embodiment of the present invention.

FIG. 3 is a signal flowchart illustrating a procedure of pausing and resuming a session in a triggered location service according to a third embodiment of the present invention. The third embodiment in FIG. 3 is similar to the first embodiment in FIG. 1. It should be noted that the third embodiment in FIG. 3 includes a pause_mode parameter in each message corresponding to steps S11 and S16.

The pause_mode parameter contains information indicating whether or not the SUPL agent 100 would accept the session pause/resumption under a state that the triggered session has been established. For instance, if the pause_mode parameter value is "0" (or "1"), it means that the session pause or resumption is granted, and on the contrary, if the pause_mode parameter value is "1" (or "0"), it means that the session pause or resumption is denied.

As another example, if the pause_mode parameter itself is included in the message (i.e., the MLP TLRR message in S11 and the SUPL TRIGGERED RESPONSE message in S16), it may be configured that session pause and resumption are accepted. That is, if the pause_mode parameter is included in the message, a function for the session pause and resumption is supported (enabled). Conversely, if the pause_mode parameter is not included in the message, the function for the session pause and resumption is not supported.

Here, it is assumed that the SUPL agent 100 accepts the function for the session pause and resumption. In order to request a session for the triggered location service from the H-SLP 200, the SUPL agent 100 sends a request message including the pause_mode parameter (i.e., MLP TLRR message) to the H-SLP 200 (S11'). The H-SLP 200 checks the pause_mode parameter. Then, when an SUPL triggered session between the H-SLP 200 and the target terminal 300 is to be started, the H-SLP 200 sends the SUPL TRIGGERED RESPONSE message to the target terminal 300 by including the pause_mode parameter therein, thereby informing the target terminal 300 that the SUPL agent 100 has accepted the function of the session pause/resumption (S16'). Accordingly, the target terminal 300 may perform each corresponding procedure when the target terminal 300 desires to pause or resume an ongoing session (S30). Here, the procedures (S30 in FIG. 2) of the session pause and session resumption are the same as those in FIG. 1 (S30 in FIG. 1).

Figure 4:
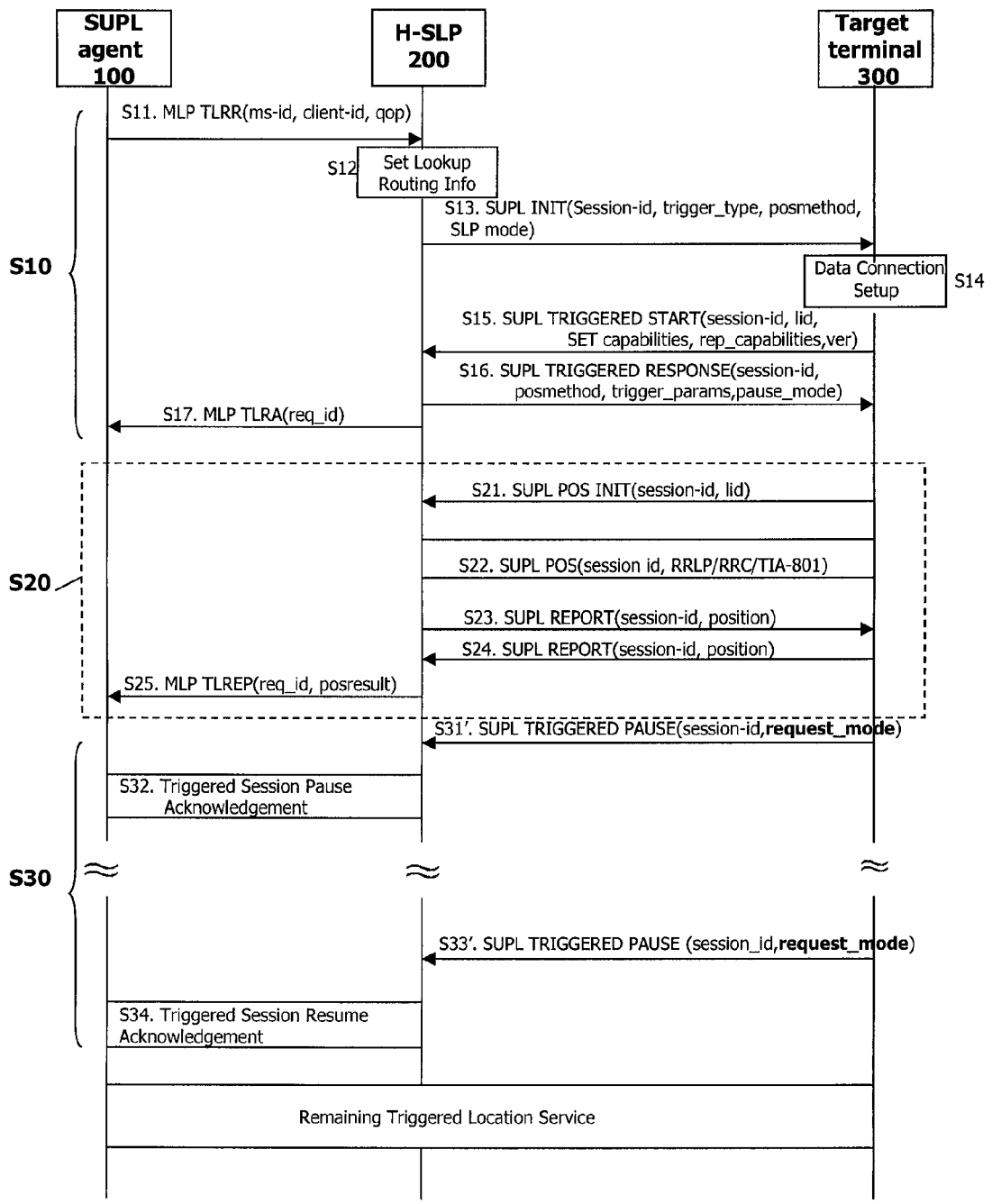
FIG. 4 is a signal flowchart illustrating a procedure of pausing and resuming a session in a triggered location service according to a fourth embodiment of the present invention.

FIG. 4 is a signal flowchart illustrating a procedure of pausing and resuming a session in a triggered location service according to a fourth embodiment of the present invention. The fourth embodiment in FIG. 4 is similar to the first embodiment in FIG. 1. The first embodiment in FIG. 1 uses the SUPL TRIGGERED PAUSE message and the SUPL TRIGGERED RESUME message to perform the session pause and resumption, however, the fourth embodiment in FIG. 4 uses only the SUPL TRIGGERED PAUSE message to perform the session pause and resumption. It should be noted that in the fourth embodiment in FIG. 4 the SUPL TRIGGERED PAUSE message includes a request_mode parameter. Based on the parameter value (e.g., request_mode=0 or request_mode=1), the SUPL TRIGGERED PAUSE message may signify the session pause or the session resumption.

Operations corresponding to steps S10 and S20 in FIG. 4 are the same as those corresponding to steps S10 and S20 in FIG. 1. Therefore, explanations for steps S10 and S20 in FIG. 4 are omitted. Hereinafter, step S30 in the fourth embodiment in FIG. 4 is described.

While the session between the H-SLP 200 and the target terminal 300 is still ongoing, there would be a case when the target terminal 300 desires to pause the session. In this instance, the target terminal 300 sends a SUPL TRIGGERED PAUSE message to the H-SLP 200 so as to notify the pause of the ongoing session (S31'). The SUPL TRIGGERED PAUSE message includes a request_mode parameter as well as a session-id parameter. The H-SLP 200 verifies the request_mode parameter value (e.g., request_mode=0) included in the SUPL TRIGGERED PAUSE message, and recognizes that the session has currently been paused. The H-SLP 200 uses the MLP message to inform the SUPL agent 100 that the ongoing triggered session has been currently paused by the target terminal 300 (S32).

Under the state that the triggered session has currently been paused through step (S31'), if the target terminal 300 can resume the paused session, the target terminal 300 sends an SUPL TRIGGERED PAUSE message (S33'). The SUPL TRIGGERED PAUSE message includes a request_mode parameter indicating that the target terminal 300 can resume the paused triggered session. The H-SLP 200 checks the request_mode value of the message (e.g., request_mode=1) and recognizes that the paused session is resumed. In addition, the SUPL TRIGGERED PAUSE message includes a session-id parameter, thereby allowing the H-SLP 200 to recognize a session between the H-SLP 200 and the target terminal 300 to be resumed. The H-SLP 200 uses the MLP message to notify to the SUPL agent 100 that the session paused by the target terminal 300 has been resumed (S34). Thusly, the paused session is resumed through step S33'.

When compared to the first embodiment in FIG. 1, the fourth embodiment in FIG. 4 uses only one message (i.e., the SUPL TRIGGERED PAUSE message) and one parameter (i.e., the request_mode) so as to perform the session pause and resumption. Therefore, the fourth embodiment in FIG. 4 has an effect of reducing the number of messages performing the session pause and resumption.

Figure 5:
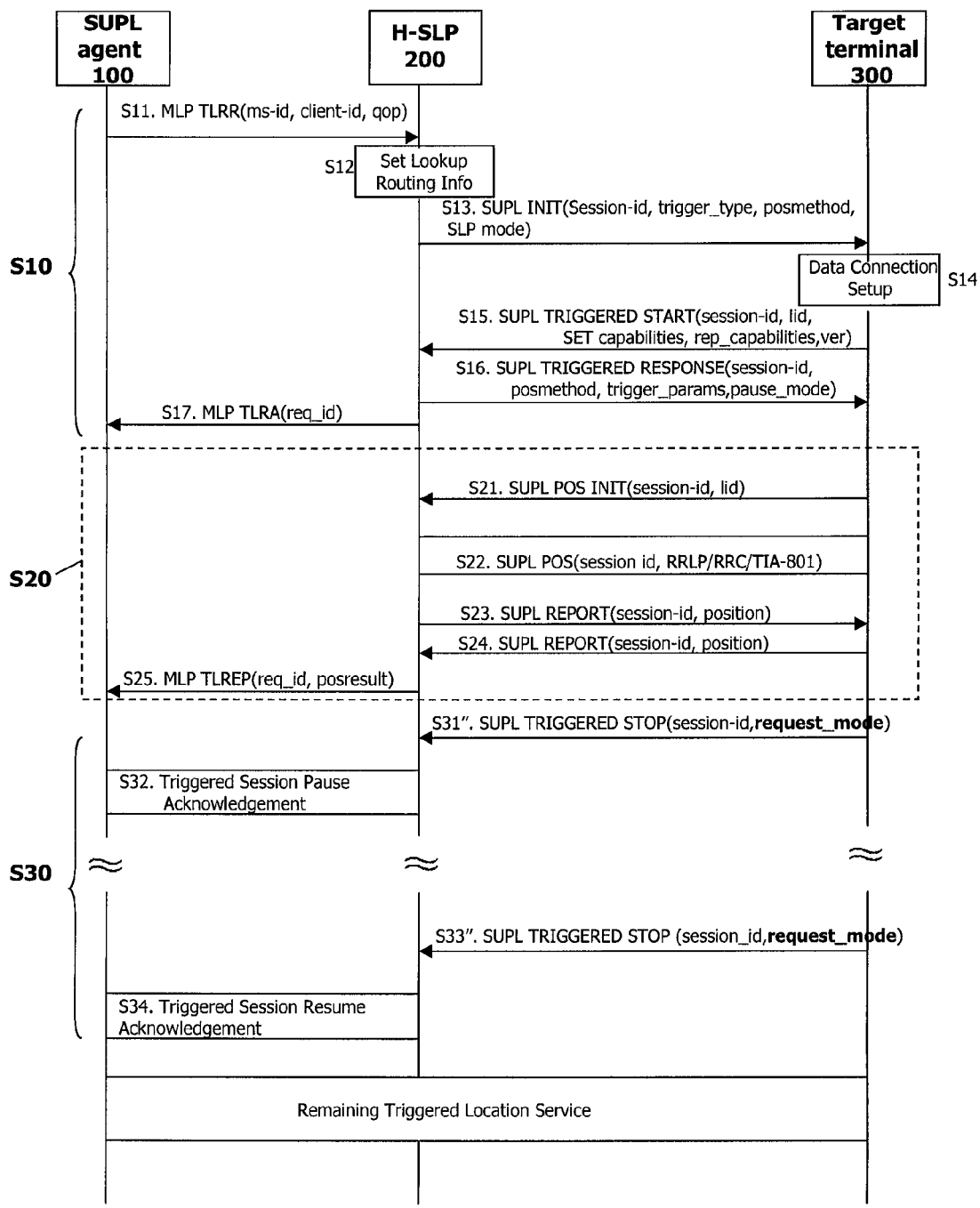
FIG. 5 is a signal flowchart illustrating a procedure of pausing and resuming a session in a triggered location service according to a fifth embodiment of the present invention.

FIG. 5 is a signal flowchart illustrating a procedure of pausing and resuming a session in a triggered location service according to a fifth embodiment of the present invention. The fifth embodiment in FIG. 5 uses an SUPL common message for a session pause/resumption, and includes a request_mode parameter in the message so as to discriminate the session pause and resumption based on the parameter value. On the contrary, in the exemplary embodiments in FIGS. 1 through 4, the SUPL TRIGGERED PAUSE message and the SUPL TRIGGERED RESUME message are the dedicated messages used for the session pause and resumption. Here, the common message refers to a general message used to perform the SUPL triggered location service (e.g., SUPL TRIGGERED STOP message: a message used to stop a session), while the dedicated message refers to a message defined for a dedicated usage of the session pause/resumption.

Descriptions of steps S10 and S20 in FIG. 5 are the same as those in S10 and S20 in FIG. 1. Therefore, explanations corresponding to steps S10 and S20 in FIG. 5 are omitted. Hereinafter, step S30 in the fifth embodiment in FIG. 5 will be described.

While the session between the H-SLP 200 and the target terminal 300 is still ongoing, there would be a case when the target terminal 300 desires to pause the session. In this instance, the target terminal 300 sends a SUPL common message (e.g., SUPL TRIGGERED STOP message) including a request_mode parameter to the H-SLP 200 so as to notify the pause of the ongoing session (S31"). The SUPL TRIGGERED STOP message includes a session-id parameter. The H-SLP 200 verifies the request_mode parameter value (e.g., request_mode=1) and recognizes that the session has currently been paused. The H-SLP 200 uses the MLP message to notify to the SUPL agent 100 that the triggered session has currently been paused by the target terminal 300 (S32).

Under the state that the triggered session has currently been paused in step (S31"), if the target terminal 300 can resume the paused session, the target terminal 300 sends the SUPL TRIGGERED STOP message (S33"). The SUPL TRIGGERED STOP message includes a request_mode parameter indicating that the target terminal 300 has resumed the paused triggered session. The H-SLP 200 checks the request_mode value of the message (e.g., request_mode=−1), and recognizes that the paused session is currently resumed. In addition, the SUPL TRIGGERED STOP message includes a session-id parameter, thereby allowing the H-SLP 200 to recognize a session to be resumed between the H-SLP 200 and the terminal 300. The H-SLP 200 uses the MLP message to notify to the SUPL agent 100 that the triggered session paused by the target terminal 300 is resumed (S34). Thusly, the paused triggered session proceeds through step S33".

Meanwhile, the request_mode parameter value (e.g., request_mode=0) may be used to indicate that the SUPL TRIGGERED STOP message is to stop the SUPL triggered session as originally defined in the message, not to indicate the pause/resumption of the session.

Figure 6:
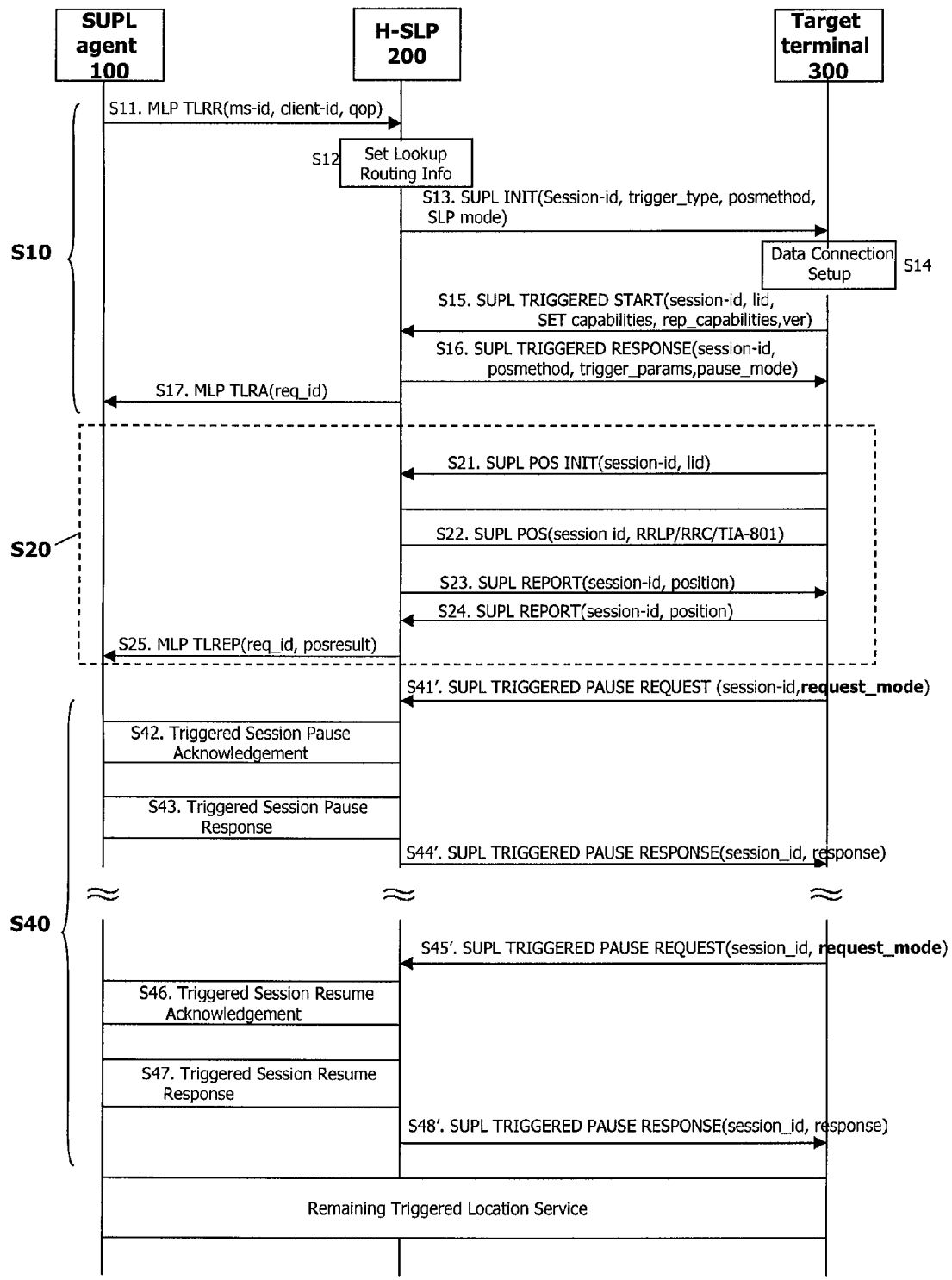
FIG. 6 is a signal flowchart illustrating a procedure of pausing and resuming a session in a triggered location service according to a sixth embodiment of the present invention.

FIG. 6 is a signal flowchart illustrating a procedure of pausing and resuming a session in a triggered location service according to a sixth embodiment of the present invention. The sixth embodiment in FIG. 6 is similar to the second embodiment in FIG. 2. That is, the subject of the session pause/resume is the H-SLP 200, not the target terminal 300. Difference between the sixth embodiment in FIG. 6 and the second embodiment in FIG. 2 is as follows: the second embodiment in FIG. 2 uses 4 different messages for session pause/resume (e.g., SUPL TRIGGERED PAUSE REQUEST/RESPONSE message, SUPL TRIGGERED RESUME REQUEST/RESPONSE message), while the sixth embodiment in FIG. 6 uses only 2 messages (i.e., SUPL TRIGGERED PAUSE REQUEST/RESPONSE message). In addition, the exemplary embodiment in FIG. 6 uses a request_mode parameter, which is used to distinguish the session pause and resumption. Therefore, as compared to that in FIG. 2, the embodiment in FIG. 6 has an effect of reducing the number of dedicated messages.

Descriptions of steps S10 and S20 in FIG. 6 have already been given in those in FIG. 1, therefore detailed explanations therefor are omitted. Hereinafter, step S40 in FIG. 6 will be described.

The target terminal 300 sends a message requesting a pause of the ongoing triggered session, i.e., a SUPL TRIGGERED PAUSE REQUEST message, to the H-SLP 200 (S41'). The SUPL TRIGGERED PAUSE REQUEST message includes a request_mode parameter and a session-id parameter. The request_mode parameter is set to a value corresponding to the request of the triggered session pause (e.g., request_mode=0 or request_mode=pause). The session-id parameter includes information indicating a session to be paused. The detailed description of the session-id parameter has already been given.

The H-SLP 200 uses the MLP message so as to notify that the target terminal 300 has requested the session pause to the SUPL agent 100 (S42). Then, the SUPL agent 100 uses the MLP message to give a positive acknowledgement or negative acknowledgement for the session pause in step S42 (S43). If the SUPL agent 100 has transmitted the positive acknowledgement for the session pause to the H-SLP 200, the H-SLP 200 sends an SUPL TRIGGERED PAUSE RESPONSE message to the target terminal 300 (S44'). The SUPL TRIGGERED PAUSE RESPONSE message is a message notifying that the request of the session pause by the target terminal 300 has been accepted and thusly the session is paused. In addition, the SUPL TRIGGERED PAUSE RESPONSE message includes a session-id parameter indicating a session to be paused. In addition, the SUPL TRIGGERED PAUSE RESPONSE message may include a reason-code (e.g., Pause Approval) indicating session pause.

Conversely, in step S43, if the SUPL agent 100 has transmitted the negative acknowledgement for the session pause to the H-SLP 200, the SUPL TRIGGERED PAUSE RESPONSE message would mean that the ongoing triggered session is to be released. Here, the SUPL TRIGGERED PAUSE RESPONSE message may include a reason-code (e.g., Pause Fail) indicating a session release.

Through the series of steps (S41'~S44'), the session between the target terminal 300 and the H-SLP 200 is currently paused. Under this condition, if the target terminal 300 is to resume the session, the target terminal 300 sends a SUPL TRIGGERED RESUME REQUEST message to the H-SLP 200 so as to request the resumption of the paused session (S45'). The SUPL TRIGGERED RESUME REQUEST message includes a request_mode parameter, which is set to a value requesting the resumption of the paused session (e.g., request_mode=1 or request_mode=resume). The SUPL TRIGGERED RESUME REQUEST message includes a session-id parameter indicating a session which has been paused and to be resumed.

The H-SLP 200 uses the MLP message so as to notify that the target terminal 300 has requested the session resumption to the SUPL agent 100 (S46). Then, the SUPL agent 100 uses the MLP message to give an acknowledgement in response to S46 (S47). The H-SLP 200 sends the SUPL TRIGGERED RESUME RESPONSE message to the target terminal 300 so as to inform the resumption of the paused session (S48'). Here, the SUPL TRIGGERED RESUME RESPONSE message includes a session-id parameter indicating a session to be resumed.

Hereinafter, description of the terminal according to the present invention, i.e., the SUPL-enabled terminal (SET), will be given in detail.

The terminal according to the present invention is a terminal capable of performing a SUPL triggered location service, and includes a SUPL agent performing the SUPL service and other basic software and hardware configurations.

The terminal according to the present invention includes a transmitter configured to transmit a triggered session pause message and a triggered session resume message; and a SUPL agent configured to generate the messages and have a parameter included in each generated message to notify a pause of the triggered session or resumption of the paused session. Meanwhile, the SUPL agent may also be referred to as a controller. In addition, each operation of such components in the present invention will be equally applied to corresponding portions explained in FIGS. 1 through 6.

The foregoing embodiments and advantages are merely exemplary and are not to be construed as limiting the present invention. It will also be apparent to those skilled in the art that various modifications and variations can be made in the present invention without departing from the spirit or scope of the invention. Thus, it is intended that the present invention cover modifications and variations of this invention provided they come within the scope of the appended claims and their equivalents.

The invention claimed is:

1. A method for providing a Secure User Plane Location-based (SUPL-based) triggered location service, comprising:
    establishing a triggered session for the SUPL-based triggered location service between a server and a target terminal;
    receiving, by the server from the target terminal, a triggered session pause message during the triggered session, the triggered session pause message related to a pause of the triggered session; and
    receiving, by the server from the target terminal, a triggered session resume message while the triggered session has been paused, the triggered session resume message related to a resumption of the paused triggered session,
    wherein each of the triggered session pause message and the triggered session resume message includes a session-id for the triggered session, and
    wherein the triggered session pause message and the triggered session resume message are implemented as a dedicated SUPL TRIGGERED message or a common SUPL TRIGGERED message.

2. The method of claim 1, further comprising:
    sending, by the server to the target terminal, a triggered session pause response message in response to the triggered session pause message; and
    sending, by the server to the target terminal, a triggered session resume response message in response to the triggered session resume message.

3. The method of claim 2, wherein the triggered session pause response message and the triggered session resume response message are implemented as a SUPL TRIGGERED PAUSE RESPONSE message as a same dedicated message.

4. The method of claim 1, further comprising:
    receiving, from a source terminal/apparatus, a SUPL triggered location service request message including a pause mode parameter; and
    transferring, to the target terminal, the pause mode parameter so as to set the triggered session.

5. The method of claim 4, wherein the pause mode parameter is set to a value indicating the pause of the triggered session or a value indicating the resumption of the paused triggered session.

6. The method of claim 1, wherein the triggered session pause message and the triggered session resume message are implemented as a SUPL TRIGGERED PAUSE message as a same dedicated message, and the SUPL TRIGGERED PAUSE message includes a request mode parameter.

7. The method of claim 6, wherein the triggered session pause message and the triggered session resume message are distinguished by a value of the request mode parameter.

8. The method of claim 7, wherein the request mode parameter is set to a value indicating the pause of the triggered session or a value indicating the resumption of the paused triggered session.

9. The method of claim 1, wherein the triggered session pause message and the triggered session resume message are implemented as a SUPL TRIGGERED STOP message as a same common message, and the SUPL TRIGGERED STOP message includes a request mode parameter.

10. The method of claim 9, wherein the request mode parameter includes one of a value indicating the pause of the triggered session, a value indicating the resumption of the paused triggered session, and a value indicating a stop of the triggered session.

11. The method of claim 1, further comprising:
    notifying, to a source terminal/apparatus, that the triggered session has been paused after receiving the triggered session pause message; and
    notifying, to the source terminal/apparatus, that the triggered session has been resumed after receiving the triggered session resume message.

12. The method of claim 1, wherein the triggered session pause message indicates that the triggered session has been paused or requests the pause of the triggered session, and
    the triggered session resume message indicates that the paused triggered session has been resumed or requests the resumption of the paused triggered session.

13. The method of claim 1, wherein the triggered session pause message and the triggered session resume message are implemented using at least one designated message having a request mode parameter related to the pause or resumption of the triggered session.

14. A method for providing a Secure User Plane Location-based (SUPL-based) triggered location service, comprising:
    establishing a triggered session for the SUPL-based triggered location service between a server and a target terminal;
    transmitting, by the target terminal to the server, a first message notifying a pause of the triggered session to the server, when the triggered session has been paused; and
    transmitting, by the target terminal to the server, a second message notifying a resumption of the paused triggered session to the server, when the paused triggered session has been resumed,
    wherein each of the first and second messages includes a session-id for the triggered session, and
    wherein the first and second messages are implemented as a dedicated SUPL TRIGGERED message or a common SUPL TRIGGERED message.

15. The method of claim 14, wherein the first and second messages are implemented using one designated message having a request mode parameter related to the pause or resumption of the triggered session.

16. The method of claim 15, wherein the one designated message is a SUPL message having the request mode parameter.

17. The method of claim 14, wherein the first and second messages are implemented using two different designated messages.

18. The method of claim 17, wherein the two different designated messages are different SUPL messages.

19. The method of claim 14, further comprising:
prior to a start of the triggered session, receiving, by the target terminal from the server, a SUPL message including a pause mode parameter related to the pause or resumption of the triggered session.

* * * * *